Dec. 18, 1951     C. E. HOLMBERG ET AL     2,578,803
IMPACT RECORDER
Filed Aug. 18, 1949     2 SHEETS—SHEET 1

INVENTORS
CARL E. HOLMBERG
THOMAS MUNGALL SR.
BY
their atty.

Dec. 18, 1951     C. E. HOLMBERG ET AL     2,578,803
IMPACT RECORDER

Filed Aug. 18, 1949

INVENTORS
CARL E. HOLMBERG
THOMAS MUNGALL SR.
BY

Patented Dec. 18, 1951

2,578,803

UNITED STATES PATENT OFFICE 2,578,803

IMPACT RECORDER

Carl Edward Holmberg and Thomas Mungall, Sr., Cleveland, Ohio, assignors to Willard S. Mielziner, Cleveland, Ohio Application August 18, 1949, Serial No. 110,924

9 Claims. (Cl. 346—7)

This invention relates to recording devices, and more particularly to a recorder to register an impact in any direction.

Many impact recorders have been built in the past. In the main, there have been unidirectional devices measuring the impact in only a single direction, either vertical or longitudinal. A few, however, have attempted to measure and record the impact in any direction.

One of the latter types of instrument was a rather crude instrument having three pendulums on long arms and using bell crank arrangements to translate the motion into a line on the recording drum. Another device used a complicated system of drums arranged as pendulums and also required bell crank arrangements of a somewhat delicate nature to record the shock. Each of these devices required springs to counter-balance the weight of the recording arms of an impulse longitudinal of the recording drum.

Our invention provides a rugged, compact device capable of recording impulses in any direction accurately. Additionally, our invention includes a new system of springs which make possible the recording of comparatively light impulses or simple accelerations and extremely heavy impulses without completely stopping the pointers. Thus, it is possible to calibrate the device for almost any magnitude of impact. The accuracy of the instrument's measurements as a percentage of the magnitude is, then, almost constant, although the accuracy in absolute values may decrease somewhat with increased loading.

Our invention also provides an electrically operated paper rolling system which makes a long continuous use possible, and the use of a battery of considerable weight lowers the center of gravity of the device and balances it so that if it falls or is dropped or jarred about, it will usually remain upright. By the use of a separate battery, it is possible to use our device in any type of conveyance independent of whether it has its own electrical system or not and of what voltage the system is.

From an analysis of the record from our device, it is possible to ascertain completely the force and direction of the impulse, since accurate measurements can be made of the magnitude of any impulse in any direction. Thus by a simple resolution of the forces acting on the device at any instant, the original force of the impact can be fully resolved.

Further advantages of our invention, and the invention itself, will become apparent from reference to the following figures which form a part of this specification.

Figure 1:
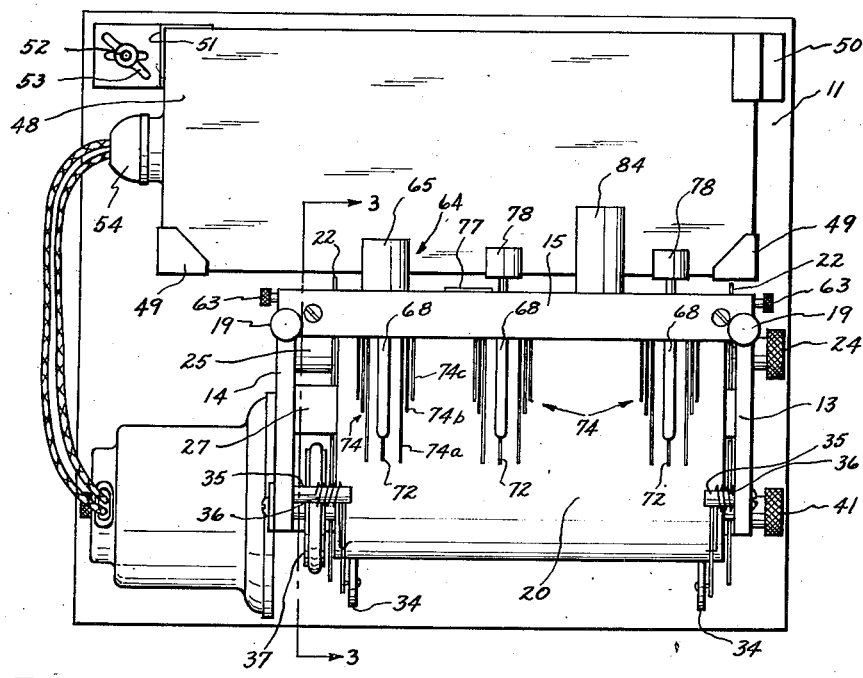
Fig. 1 is a top plan view of the mechanism of our device.

Briefly, our invention comprises an impact recorder having a frame within which is mounted a paper tape rolling system and a set of pendulums which are responsive to accelerations in any of three dimensions; longitudinal, lateral or vertical. The tape rolling system is a continuous, and constant speed device so that the time when any event recorded on the tape occurred can read from the tape which is preferably ruled transversely thereof with a scale representing the hours of the day.

Each of the pendulums is mounted on a pivot axle perpendicular to the direction of the force it is adapted to measure. Also mounted on this axle are the stylus arms. Each arm carries a stylus which presses on the paper tape as it passes over a smooth strip which acts as a table. The stylus arms are kept centered by a spring of fairly light modulus. That is, it may be deflected by a light load. However, adjacent the arms, supplementary springs are provided which are engaged successively as the arm is displaced a certain distance. Thus, for the first increment of displacement, the stylus is sensitive to fairly small impulses or accelerations. As the displacement increases, the sensitivity is correspondingly less, but since the absolute value of force on the springs is high, the accuracy of the instrument as a percent of the load may be made virtually constant. Counterweights mounted on the axles are provided to negate the effect on the stylus arms of an acceleration in a direction perpendicular to them, thus increasing the accuracy of the instrument.

More specifically, and with reference to the figures, our invention is mounted on a base plate 11. On the plate is fixed a mounting plate 12 for our recorder. A framework comprising side pieces 13 and 14 joined by a cover strip 15 is mounted on the plate 12. For ease of construction, we prefer to make this strip 15 of two pieces, a bearing strip 16 and a closing strip 17. The reason for this will be made apparent hereinafter.

Figure 2:
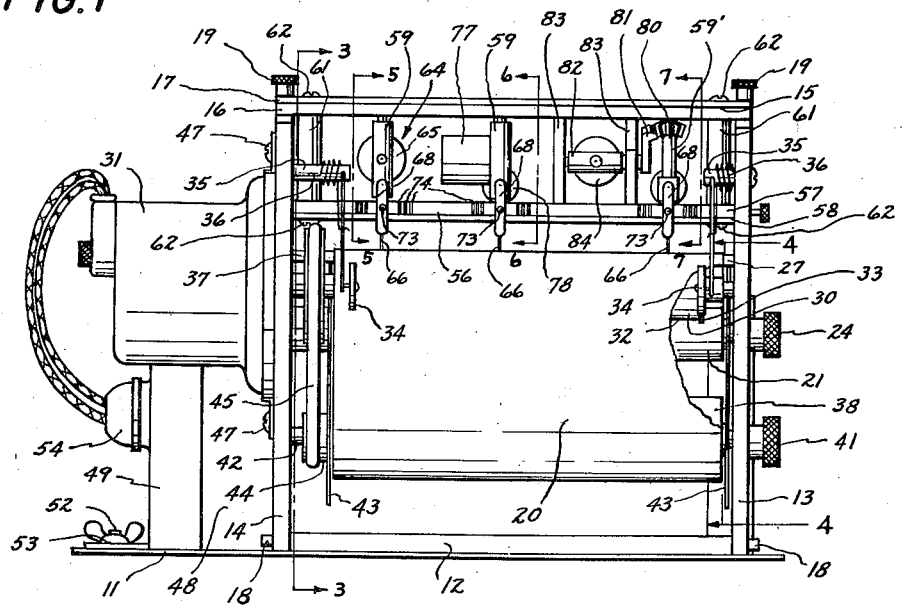
Fig. 2 is a front elevational view thereof.

The side pieces 13 and 14 are shown (Fig. 2) fastened to the mounting plate 12 by screws 18. It will be appreciated that such manner of mounting is not exclusive, and that any other convenient means may be used. Similarly, the cover strip 15 is shown held in place by knurled headed screws 19 through the strip in order to make the recorder mechanism readily removable from the framework as is more fully explained hereinafter.

Included within the frame is a paper tape rolling mechanism on which the record is made. The tape 20 is preferably of the variety which is treated so that a simple stylus will mark it without need for pencil lead or ink. This tape is carried on a supply roll 21 having flanges 22 to keep the paper aligned. The supply roll is journalled on a shaft 23 which extends through the roll 21 and through the sides 13 and 14. This shaft may be formed with a knurled head 24 on the end nearest side 13 and be threaded into side 14 for better support and easy removal of the roll. A bushing 25, which is preferable formed integrally with or affixed to the flange 22 on the one side, serves to space the supply roller 21 properly in the framework.

Figure 3:
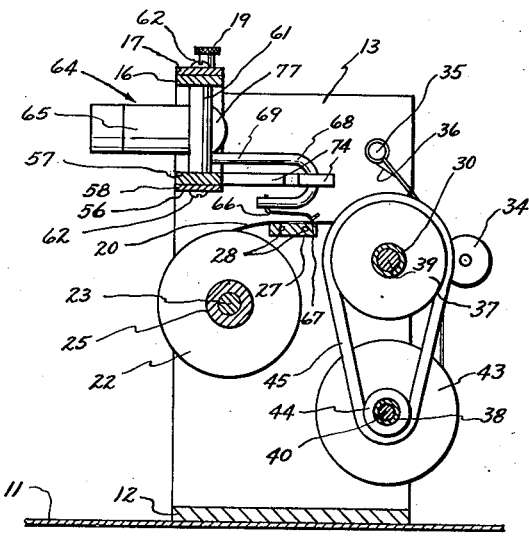
Fig. 3 is a sectional view along line 3—3 of Fig. 2.
Figure 4:
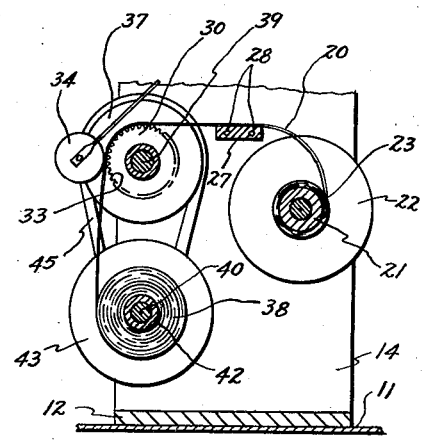
Fig. 4 is a sectional view along line 4—4 of Fig. 2.

From the supply roller, the tape 20 passes over a table strip 27 fixed between the sides 13 and 14. As shown in Fig. 3, the preferred mode of fastening this strip is merely a pair of dowels 28 in each end. This insures good alignment of the table and makes assembly of the device comparatively easy.

From the table strip 27, the tape 20 passes over the feed roller 30. This roller is driven by a clock motor 31 which is preferably an electric wound motor having a six volt winding motor such as is commonly in use in automobile clocks. The roller is comprised of a drum 32 having a toothed wheel 33 at each end. The tape 20 passes over these wheels and is pressed onto them by rubber tired wheels 34 mounted on the sides 13 and 14 on posts 35 and pressed into contact with the tape by light springs 36. A pulley 37 is carried by the feed roller 30 to drive the take-up roller 38 as described hereinafter. The feed roller 30 is fixed to a shaft 39 which is journalled in the sides 13 and 14 and which may be coupled to the motor 31 by any convenient means (not shown).

The take-up roller 38 is supported by a shaft 40 exactly similar to the shaft 23 of the supply roll 21 and having a knurled head 41. Thus it is possible to remove the completed record on this roll quickly and easily. The roller itself is formed from a tubular center 42 extending through and fastened to flange 43 at either end. The tube 42 is long enough to act as a spacing device for the roller between the sides 13 and 14. On one end, a pulley 44 is formed integrally with or affixed to the flange, and this is driven by a belt 45 from the pulley 37 on the feed roller. In order to keep the tape 20 taut at all times, the take up pulley 44 is considerably smaller than the feed roller pulley 37. Thus, when the roll of tape on the take up roll is small, the roller 38 is driven just fast enough to wind up all the tape being fed to it by the constant speed feed roller 30. As the roll of tape on the takeup roller grows in size, the belt 45 must necessarily slip somewhat since the takeup roller 38 will tend to take up the tape at a speed greater than the feed roller 30 is supplying it. Thus, the tape 20 will be kept under a slight tension at all times.

The motor 31 as stated may be any type of constant speed motor but is preferably an electrically wound clock motor such as is common in automobile clocks. It is mounted on the side 14 by screws 47 and is coupled to the feed roller shaft by means not shown. Since it is contemplated that this device will be used where there is no other source of power, a battery 48 is provided which supplies the voltage necessary to run the motor. This battery 48 may be of any dimension, but a convenient size is illustrated mounted on the back of the plate 11. The mounting clips may be of any convenient form of which several are illustrated. As shown, the two clips 49 nearest the recorder are of angular formation embracing the corners of the battery 48 and are bent over at the top to hold the battery from vertical movement. This type of clip may be welded to the plate 11. Another type is represented by the clip 50 at the upper right corner (Fig. 1). This is a simple Z-shaped piece of metal beneath which the battery may slide and which may be spot-welded to the plate 11. The removable clip 51 at the other corner simply embraces the corner and is held to the plate by the screw 52 on which is threaded a wing nut 53. The combination shown provides a holding means from which the battery may be readily removed for replacement.

A plug 54 provides an easily detachable connection between the battery and the motor, and it is conceived that a switch arrangement, such as a toggle switch, may be used to start and stop the device. To prevent unauthorized use, the switch could be of the locking type used in automobile ignitions. This switch could also be placed on the container in which the recorder is to be placed, thus making removal of the device from the container unnecessary except for removal or inspection of the record.

The operating mechanism is mounted between the top strip 15 and a lower strip 56 which may be formed of two strips, a bearing strip 57 and cover strip 58, similar to the top strip. Each of the bearing strips 16 and 57 is formed with holes in which the vertical axles 59 and 59' of the stylus arms are journalled. The cover strips 17 and 58 serve to cover these openings to prevent dust or any foreign matter from entering the bearings. The bearing strips are preferably made of brass or aluminum, and the cover strips may also be made of this material for the sake of appearance.

The top and lower strips are held in a fixed relation by a pair of posts 61 to which the strips are fastened by screws 62. The lower strip 56 is further held in place by knurled headed screws 63 extending through the sides 13 and 14. These screws 63 along with the screws 19 are the only devices holding the mechanism in place, and, therefore, it can be seen that the mechanism may readily be removed by removing the screws 19 and 63 and sliding the mechanism from the rear of the frame.

Our device is adapted to record an impulse from any of three directions or any combination thereof. For the purpose of this specification, these directions may be defined as follows: longitudinal, in the direction of the axis of the rollers; vertical, in a direction perpendicular to the base plate; and lateral, in a direction parallel to the base plate and perpendicular to the axis of the rollers. In order to measure impulses in any of these directions, three pendulums are used. In each, the center of gravity of the weight is displaced from its axis of motion on a line perpendicular to the direction of the force which it is supposed to measure. Thus, the pendulum 64 nearest the motor will measure a longitudinal force, since the only possible motion of its weight 65 will be in a longitudinal direction.

Figure 6:
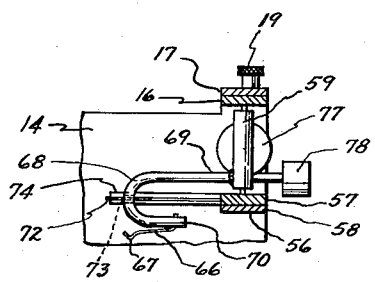
Fig. 6 is a detailed sectional view along line 6—6 of Fig. 2.

The record is made by a stylus 66 which may be formed of a piece of stiff wire bent to the shape shown having a rounded point 67 for engaging the treated paper and marking a trace therein. Each stylus 66 is fixed to an arm 68 by inserting the wire through a hole in the arm and soldering it in place. Each arm 68 is substantially U-shaped having one longer leg 69 fixed to the axles 59 and 59' and a shorter leg 70 carrying the stylus 66. The arm is held in a centered position by a centering spring 72 best shown in Fig. 6. This spring 72 may be formed of a length of stiff wire held in a hole in the lower bearing plate 57. It extends loosely through a hole 73 in the bottom of the U of the arm and thus is adapted to resist movement in any direction. The hole 73 is purposely made somewhat larger than the spring 72 for a reason to be made clear hereinafter.

Subsidiary springs 74 are provided to make possible the measurement of heavier loads than the centering spring 72 alone would allow. These springs comprise a series of flat, spring metal strips spaced alongside the arm in position to be engaged thereby. Thus, if an impulse in a longitudinal direction is greater than can be measured by a deflection of the distance between the arm and the longest subsidiary spring 74a (Fig. 1), then the arm will engage that spring, and the modulus of the spring being correspondingly larger, the measurement of heavier impulses will be possible. The same purpose is met by the successive leaves 74b and 74c of the spring. While we have shown three leaves, it is envisioned that more or fewer may be used if desired. Thus, as the impact gets larger, the sensitivity of the instrument is decreased and, therefore, it is possible to calibrate the device for all types of loading from the lightest which would be measured against the resistance of only the centering spring 72 to the heaviest which would be measured against the whole spring system. It will be apparent to those skilled in the art that any or all of the springs may be replaced with springs of greater or smaller modulus depending on the use to which the instrument is to be put.

While the sensitivity of the instrument and its accuracy in absolute units is decreased by the use of the heavier springs, the accuracy as a percent of the load may be made substantially constant. For example, if the full deflection of the arm 68 against the centering spring 72 alone required an impact of 10 units and the maximum error was 1 unit, the accuracy might be said to be 90% for that portion of the deflection. Then if the full deflection of the arm 58 when influenced by the centering spring 72 and the first leaf 74a were 30 units and the maximum error were 3 units, the accuracy of the device would still be 90%. This proportion could be carried through for the entire system if desired, but even if the proportion is not constant, the effect will be the same, and the error will be roughly proportional to the load throughout the scale of deflection.

It should be noted that these springs 74 are not mere stops, but that the deflection of the arm may be calibrated to read loads not previously recorded by this type of instrument.

Figure 5:
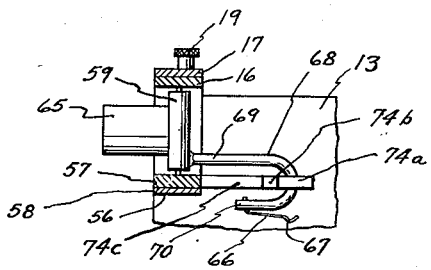
Fig. 5 is a detailed sectional view along line 5—5 of Fig. 2.

The weights which form the pendulums of our device are mounted so that they move only in a direction parallel to the force which they measure. Thus, the longitudinal pendulum (Fig. 5) has its weight 65 mounted on a vertical axle 59 in a lateral direction from the axle. Therefore, its motion will be longitudinal. In order to obtain an accurate record, the calibration of this pendulum must take into account the weight of the stylus arm 68 which will also be affected by longitudinal shock. This may be done by increasing the size of weight 65, by changing its moment arm about the axle, or by making a correction to the scale of deflection. While the first named method is preferred, any of the three is fully satisfactory.

The lateral force pendulum (Fig. 6) is mounted on a similar vertical axle 59. The weight 77 for this pendulum, however, must be displaced in a direction longitudinal from the axis of its axle 59. Therefore, in this case it becomes necessary to balance the effect of the arm 68 by a counterweight 78 having the same moment about the axle 59. Thus, if this pendulum and arm arrangement is subjected to a purely longitudinal impulse, there would be no deflection due to the weight of the arm since this is properly counterbalanced by the counterweight 78.

Figure 7:
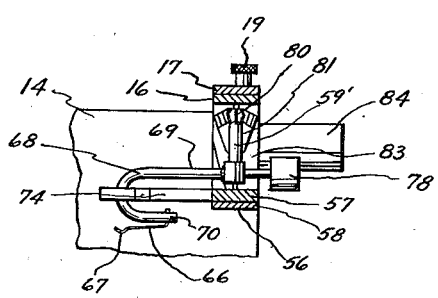
Fig. 7 is a detailed sectional view along line 7—7 of Fig. 2.

The vertical force pendulum (Fig. 7) requires a device to change the direction of its movement since the axle of its stylus arm is vertically mounted similarly to the others. The axle 59' is formed with a small bevel gear 80 on its upper end. This gear 80 is enmeshed with a segmental gear 81 fixed on a horizontal axle 82. The horizontal axle 82 is journalled longitudinally in a pair of vertical bearing plates 83 mounted between the horizontal bearing strips 16 and 57 on dowels. The pendulum weight 84 is fixed to this horizontal axle. The arm 68 is counterbalanced by a counterweight 78 similar to that used on the lateral force pendulum. Thus a vertical impulse causes the deflection of the weight 84 which is transmitted through the gears 80 and 81 to the arm 68 and recorded by the stylus 66.

The operation of the device is clear. After the device is installed properly in the article or vehicle where it is desired to measure the impacts, the motor 31 may be started. This will drive the feed roller 30 and, therefore the tape 20 at a constant speed, for example, one inch per hour. If the vehicle or article on which the instrument is mounted should be subjected to an acceleration (or deceleration) or a shock which is simply a sudden acceleration, the pendulum weights 65, 77 and 84 because of their mass would be subjected to a force in a direction opposite to the acceleration. However, since each weight is constrained to move in only one direction, it will measure only the component of that force in its particular direction. This measurement is recorded on the tape 20 by each separate stylus 66. At the end of the journey or any portion thereof, the record may be removed for study. Since the record contains a measurement of three mutually perpendicular components of the force, it is possible to reconstruct the original force by resolving the three components. If the speed of the tape 20 is fast enough, it will also be possible to determine whether the force was due to a sudden impact or merely a sharp turn which would apply the force over a longer period of time.

Our device is also adapted to show if the container in which the device is placed has always been held upright or not. Since the hole 73 is larger than the centering spring 72, there is some free play in the arms 68. When the device is upright, this play is approximately uniformly distributed beside the springs 72 except for the vertical force pendulum where the weight 84 will hang downwardly causing the arm 68 to move against its spring 72. This will cause the stylus to mark a trace on the paper at one level. If the container should now be tipped on a side or on its top, the weights are free to shift, depending on which side the container is resting, thus causing a shift in the stylus arms. This results in a trace on the tape 20 at a level other than the normal level and makes possible a positive showing that the container was shipped in other than a normal position.

It will be recognized that any of the pendulums could be mounted separately, if an inexpensive unidirectional recorder were desired without departing from the scope of our invention. Thus, if only the longitudinal forces were of interest, a device could readily be built having a tape drive and only the longitudinal pendulum with its spring system. The tape 20 would then be considerably narrower, and a shorter battery would have to be used in order to make the equipment as compact as possible.

Having thus described an embodiment of our invention, we are aware that numerous and extensive departures may be made therefrom without departing from the spirit or scope of our invention.

We claim:

1. In an impact recorder having a frame and a paper tape feeding mechanism mounted on said frame, the combination of three pivot axles mounted adjacent each other on said frame, a stylus arm carried by each of said axles in substantially parallel relation and a stylus carried by each arm adapted to mark a record on said tape, the first of said axles carrying a weight thereon in diametric opposition to the first of said arms adapted to swing when subjected to an impulse longitudinal of said frame, the second axle carrying a weight in a right angle relationship to said arm adapted to swing when subjected to an impulse laterally of said frame, a pinion gear mounted on the third of said axles, a segmental gear engaging said pinion, an axle for said segmental gear journalled in said frame in a horizontal plane, a weight mounted on said last named axle adapted to swing when subjected to an impulse vertically of said frame to cause said third arm to move, said arms, weights and axles coacting to produce a complete record of impulses on said tape.

2. In a recording device having a frame, a paper tape for receiving a record and a feeding mechanism for said tape, recording means having a calibration varying with displacement comprising a stylus arm pivotally mounted on said frame, a series of resilient members disposed besides said arm, each of said resilient members being held in spaced relation to each other and to said arm, said arm adapted to engage said resilient members successively, incurring, therefore, successively heavier resistance to displacement.

3. In a recording device having a frame, a paper tape for receiving a record and a feeding mechanism for said tape, recording mechanism having a calibration varying with its displacement comprising a stylus arm pivotally mounted on said frame, a centering spring mounted on said frame engaging said arm to hold said arm to a central position, a series of leaf springs mounted on said frame in spaced parallel relation to said arm and to each other, said arm on being displaced from its central position adapted to displace said centering spring and then to engage and displace said leaf springs sequentially.

4. A recorder comprising a base plate, a source of electric power mounted on said plate, frame means mounted on said plate adjacent said power source, a tape supply roll carrying a supply of paper tape journalled in said frame, a feed roller journalled in said frame adapted to pull said paper tape from said supply roll, a motor actuated by said power source mounted on said frame adapted to drive said feed roller, a take-up roller journalled on said frame driven by said motor adapted to take up said paper tape from said feed roller, a group of three pendulums each having an arm and a stylus carried by the arm mounted on said frame adapted to trace a record on said paper tape, said pendulums adapted to measure the component of an acceleration in a longitudinal, lateral and vertical direction respectively.

5. In a recording machine having a frame, a paper tape, mechanism for feeding said tape, and recorder mechanism including an arm and a stylus carried by said arm, means for varying the amount of force necessary to displace the arm a unit distance depending on the displacement comprising a plurality of resilient members mounted on said frame adjacent said arm, said resilient members being held in spaced relation from each other and from the arm but adapted to be engaged successively by said arm on displacement thereof.

6. In a recording device having a frame, a paper tape for receiving a record and a feeding mechanism for said tape mounted on said frame, recording mechanism having a calibration varying with its displacement comprising a stylus arm pivotally mounted on said frame, a centering spring mounted on said frame at one end and loosely encompassed by said arm at the other end to allow some freedom of said arm at its central position, a system of leaf springs mounted on said frame in spaced parallel relation to said arm, said arm on being displaced from its central position adapted to engage and displace said centering spring and, successively, said leaf springs.

7. In a recording device having a frame, a paper tape for receiving a record and a feeding mechanism for said tape mounted on said frame, mechanism to record tipping of said device comprising a stylus arm pivotally mounted on said frame, a weight adapted to move said stylus arm responsive to a change in position or an acceleration, a centering spring for said arm mounted on said frame at one end and loosely encompassed by said arm at the other end to allow some freedom of said arm near its central position.

8. In an impact recorder having a frame and paper tape feeding mechanism mounted on said frame; the combination of three pivot axles mounted adjacent each other on said frame, a stylus arm carried by each of said axles, and a stylus on each arm adapted to mark said tape, the first of said axles carrying a weight thereon in diametric opposition to the first of said arms adapted to swing when subjected to an impulse longitudinal of said frame, the second axle carrying a weight in a right angle relationship to said arm adapted to swing when subjected to an impulse laterally of said frame, a counterweight on said second axle diametrically opposed to said arm to compensate for the inertia of said arm in a longitudinal direction, a pinion gear mounted on the third axle, a segmental gear engaging said pinion, an axle for said segmental gear journalled on said frame in a horizontal plane, a weight mounted on said last named axle adapted to swing when subjected to an impulse vertically of said frame to cause the third of said three arms to move, and a counterweight on said third axle diametrically opposed to said third arm to counteract the effect of a longitudinal impact on said third arm, said arms, weights and axles coacting to produce a complete record of impulses on said tape.

9. In an impact recorder having a frame and a paper tape feeding mechanism mounted on said frame, the combination of three pivot axles mounted adjacent each other on said frame, a stylus arm carried by each of said axles in spaced relation and a stylus carried by each arm adapted to mark a record on said tape, a series of leaf springs mounted on said frame in spaced parallel relation to each arm and to each other adapted to be successively engaged by the arms as they are displaced, the first of said axles carrying a weight thereon in diametric opposition to the first of said arms adapted to swing when subjected to an impulse longitudinal of said frame, the second axle carrying a weight in a right angle relationship to said arm adapted to swing when subjected to an impulse laterally of said frame, a pinion gear mounted on the third of said axles, a segmental gear engaging said pinion, an axle for said segmental gear journalled in said frame in a horizontal plane, a weight mounted on said last named axle adapted to swing when subjected to an impulse vertically of said frame to cause said third arm to move, said arms, weights and axles coacting to produce a complete record of impulses on said tape.

CARL EDWARD HOLMBERG.
THOMAS MUNGALL, Sr.

REFERENCES CITED

The following references are of record in the file of this patent:

UNITED STATES PATENTS

| Number | Name | Date |
|---|---|---|
| 1,247,737 | Stout et al. | Nov. 27, 1917 |
| 1,282,693 | Hollingdrake | Oct. 22, 1918 |
| 1,696,420 | Stout | Dec. 25, 1928 |
| 2,414,976 | Redhed | Jan. 28, 1947 |